No. 651,532. Patented June 12, 1900.
L. H. McCRADY.
DOUGH KNEADER.
(Application filed Oct. 16, 1899.)

(No Model.) 2 Sheets—Sheet 1.

Witnesses:
Harold B. Barrett
Robert Warr

Inventor:
Libbie Horrey McCrady
By John N. Hill
Atty.

THE NORRIS PETERS CO., PHOTO-LITHO., WASHINGTON, D. C.

No. 651,532. Patented June 12, 1900.
L. H. McCRADY.
DOUGH KNEADER.
(Application filed Oct. 16, 1899.)
(No Model.) 2 Sheets—Sheet 2.

Witnesses: Inventor;
Harold E. Barritt Libbie Henry McCrady
Robert Weir By John D. Hill
Atty.

THE NORRIS PETERS CO., PHOTO-LITHO., WASHINGTON, D. C.

UNITED STATES PATENT OFFICE.

LIBBIE HARVEY McCRADY, OF LANCASTER, WISCONSIN, ASSIGNOR OF ONE-FOURTH TO WILLIAM F. HOIG, OF CHICAGO, ILLINOIS.

DOUGH-KNEADER.

SPECIFICATION forming part of Letters Patent No. 651,532, dated June 12, 1900.

Application filed October 16, 1899. Serial No. 733,839. (No model.)

*To all whom it may concern:*

Be it known that I, LIBBIE HARVEY MC-CRADY, a citizen of the United States of America, residing at Lancaster, county of Grant, in the State of Wisconsin, and whose post-office address is said Lancaster, Wisconsin, have invented certain new and useful Improvements in Dough-Kneaders, of which the following is a description.

Figure 1:
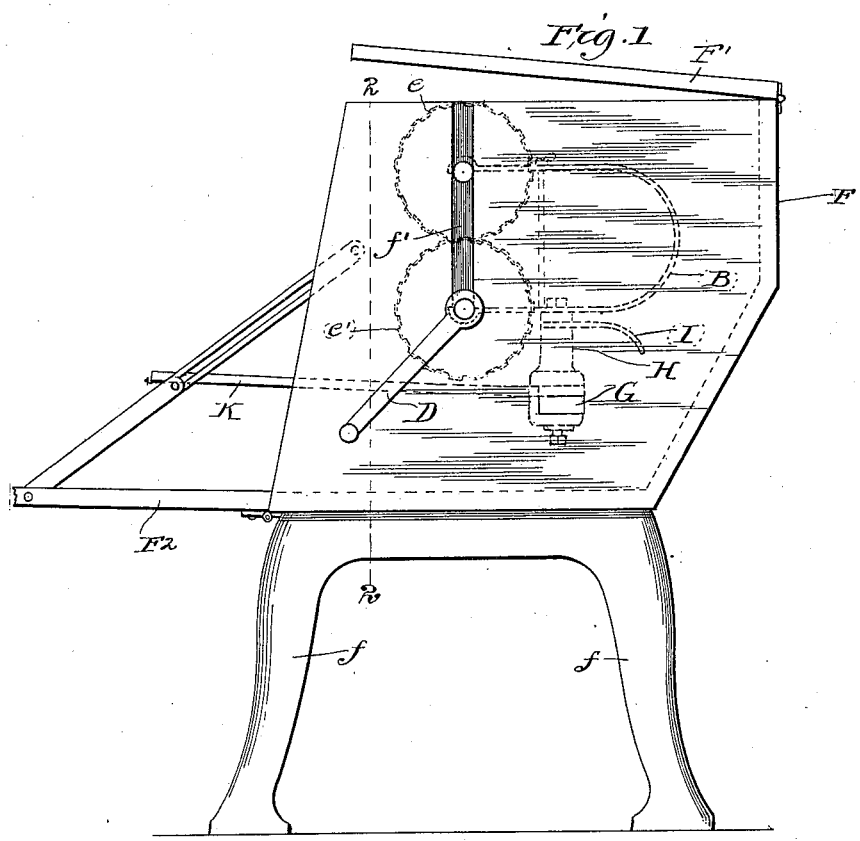
Figure 2:
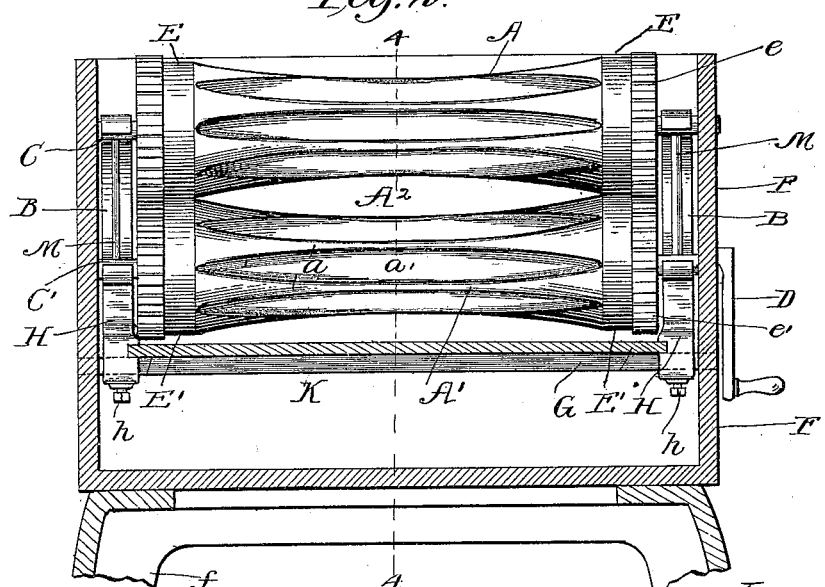
Figure 4:
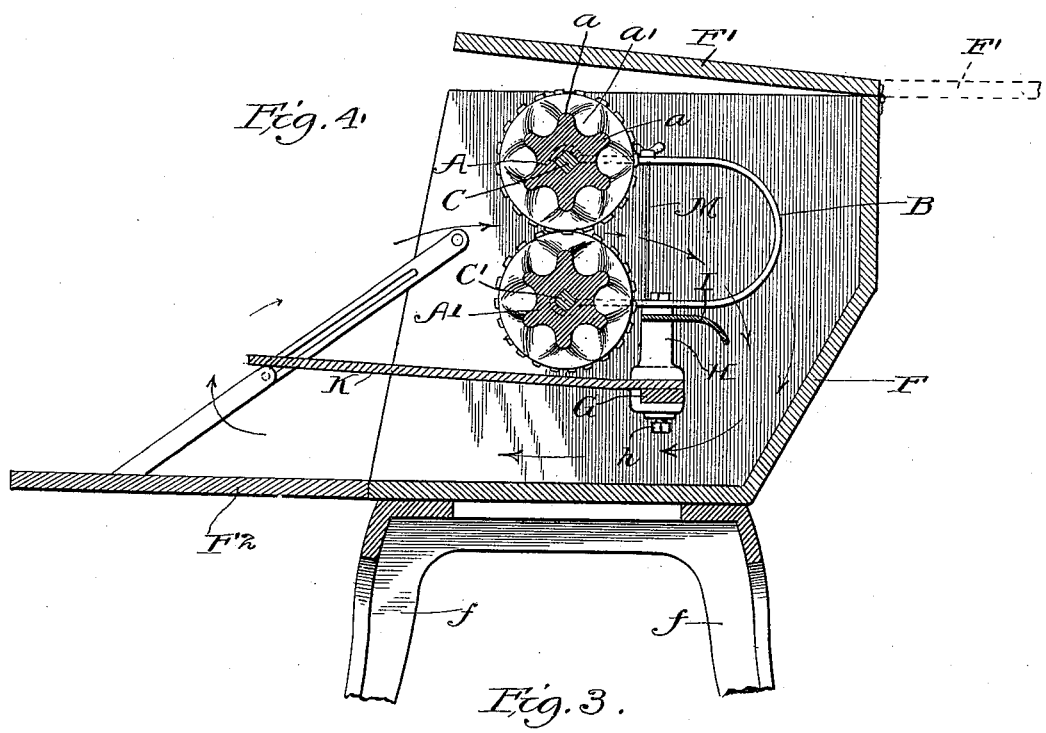
Figure 3:
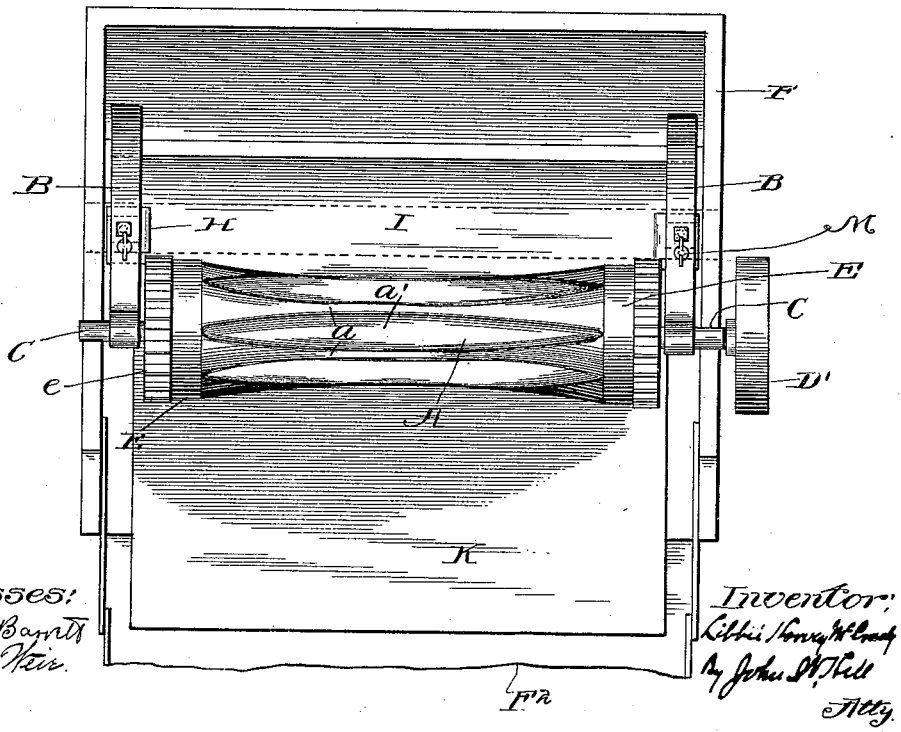

Referring to the accompanying drawings, wherein like reference-letters indicate like or corresponding parts, Figure 1 is a side elevation of a case, dotted lines showing the position of my improved kneader within the same. Fig. 2 is a front view of the same, in partial section in line 2 2 of Fig. 1. Fig. 3 is a top plan of my improved kneader, and Fig. 4 is a vertical section of the same in line 4 4 of Fig. 2.

The object of my invention is to provide a simple and efficient device for the thorough kneading of dough in the making of bread and similar products.

To this end it consists in the novel construction and combination of parts herein shown and described, and more particularly pointed out in the claims.

In the drawings, A A' are rollers longitudinally fluted, causing ribs $a$ $a$ and intervening depressions $a'$. The rollers are held in proper relative position by any suitable means—as, for example, by the spring-frames B B, as is common in such devices as wringers, &c. The rollers are properly mounted upon shafts C C' in such a manner as to rotate with the same, while upon one side of the said shafts, as upon C', suitable means are provided for driving the shaft. In the drawings the crank D serves this purpose, as shown in Fig. 1, while in some cases where power is used a pulley D' may be employed, as shown in Fig. 3. The ends of the roller may be provided with collars E E', adapted to engage with one another to drive the rollers in unison. In the preferred form at one or both ends of the rollers the collars are provided with gears $e$ $e'$ or other equivalent means for insuring the proper engagement of the parts.

An important feature of my device consists in the proper construction of the rollers A A'. In order to secure the best results, the rollers should be longitudinally fluted, as described, and so constructed that there is a comparatively-wide space between them near the middle, while near the ends they approach closer together. This is secured by constructing the rollers with their greatest diameter near the ends and the least near the middle and gradually tapering them toward the middle. The effect of this construction is that the dough fed to the machine is pressed or crowded toward the middle, giving it a sidewise pressure. This construction also prevents the dough creeping toward the ends of the rolls and into the collars E E'. The fluting of the rollers is also important, as by this means the dough confines a quantity of air within the depressions $a'$, which acts as a cushion, and as the dough emerges from between the rollers this air-cushion aids in detaching or disengaging the dough from the rollers. I also prefer to have the ridges $a$ with curved or rounded outlines rather than sharp or V-shaped, as it has a kneading effect rather than a cutting effect. I also prefer to construct the grooves or depressions $a'$ deeper near the middle of the rollers. A shelf or guide I extends back of the machine, while, if desired, a removable board K may be placed to extend forward.

In the preferred construction I employ a case F, provided with a cover F' and a front $F^2$, which is adapted to be opened downward and retained in substantially-horizontal position, as shown. The case is mounted upon suitable legs $f$, which, if desired, may be permanently secured to the floor. The case is of a size adapted to contain the kneader and inclose the same, as shown. It is also so formed that the kneader may be easily and quickly removed and the case may be employed as a bread-raiser, of which when the front $F^2$ is opened downward it serves as a kneading-board, while the top F' when opened backward, as shown in dot lines, serves the purpose of a shelf. Any preferred means may be employed for firmly securing the kneader within the case. In the drawings the bar G extends transversely across the case in such a manner that the clamps H of the kneader may be firmly secured thereto by means of the screw $h$. As thus positioned the shaft C extends through the slot $f'$ in the case F for the attachment of the handle D or pulley D'. It will be observed that by this means the kneader may be easily disengaged from the case and as readily attached to any suitable table or trough. It is also apparent that the rollers may be easily removed for cleansing or for changing. If desired, an arm M may be provided to aid in separating the springs B when removing or placing the rollers.

The mode of operation is as follows: Assuming that the kneader is in the case, as shown, the dough is placed in the opening between the rollers shown at $A^2$, Fig. 2, when the rotation of the rollers grasps and draws it between them. The formation of the rollers gives the dough a sidewise pressure, while in passing between them the tendency is also to flatten or squeeze it together, thoroughly kneading it. As it passes through the rollers it falls upon the table or guide I, and striking the back of the case is pressed downward and guided backward and finally emerging upon the table $F^2$, when it may be taken out and fed directly through the machine, or, if preferred, further manipulated with the hands, either upon the table $F^2$ or the removable table K, and again passed through the machine. If desired, the guide I may also be detachable and the cross-piece G so formed near its central part that very soft dough after passing through the rollers will clear the same in its fall to the bottom of the case, or other equivalent means be employed for the same purpose.

It is obvious that after thus having described my improvements various immaterial modifications may be made without departing from the spirit of my invention. Hence I do not wish to be understood as limiting myself to the exact construction shown.

Having thus described my invention, what I claim as new, and desire to secure by Letters Patent, is—

1. In combination, a kneading-machine comprising a suitable frame carrying two opposing rollers, said rollers being longitudinally fluted with the depressions deeper near the middle thereof, and also gradually tapering from the large ends toward the middle, and means for rotating the rollers, substantially as described.

2. In combination, a kneading-machine comprising a suitable frame carrying two opposing rollers, said rollers being constructed with a series of depressions $a'$ deeper near the middle of the rollers and separated by rounded projections $a$, the rollers gradually tapering from the larger ends toward the middle, and means for rotating the same, substantially as described.

3. In combination, a kneading-machine, a frame provided with the guide I and the springs B, the rollers A A' retained in position by said springs, the clamps H and the removable table K, and means for rotating the rollers, substantially as described.

4. In a device of the kind described, a case F provided with the top F' and table $F^2$ and the transverse bar G in combination with a frame adapted to be secured to the bar G and carrying the rollers A A', and means for rotating said rollers, substantially as described.

5. In a dough-kneading machine, the combination of a suitable frame, two opposing rollers journaled thereon, means for rotating the rollers, said rollers tapering from their points of greatest diameter near the ends toward the middle and provided with channels or depressions terminating short of the ends of the rollers whereby air-pockets are formed when the dough is being kneaded which prevents the dough from adhering to the rollers, substantially as described.

LIBBIE HARVEY McCRADY.

Witnesses:
W. F. HOIG,
BESSIE SHADBOLT.